United States Patent Office 3,585,222
Patented June 15, 1971

3,585,222
STEROIDAL TRIETHYLAMMONIUM SALTS AND METHODS OF PREPARING THE SAME
John Paul Dusza, Nanuet, N.Y., Joseph Peter Joseph, Cliffside Park, N.J., and Seymour Bernstein, New York, N.Y., assignors to American Cyanamid Company, Stamford, Conn.
No Drawing. Filed May 23, 1969, Ser. No. 827,176
Int. Cl. C07c 169/10
U.S. Cl. 260—397.4                6 Claims

ABSTRACT OF THE DISCLOSURE

The preparation of steroidal triethylammonium salts by the fusion of equilenin or equilin and triethylamine-sulfur trioxide, is described. The products are useful as estrogenic agents.

DESCRIPTION OF THE INVENTION

This invention relates to new steroid compounds. More particularly, it relates to aromatic steriod triethylammonium sulfate salts and methods of preparing the same.

The novel steroid salts of this invention may be illustrated by the following formula:

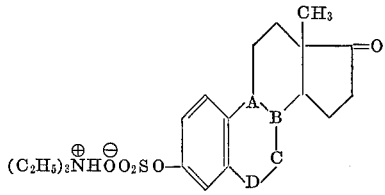

wherein

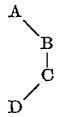

is selected from the group consisting of

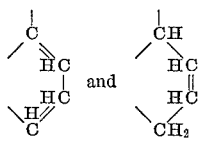

The steroid salts of the present invention are solids having well defined melting points. They are more water soluble than the steroids from which they are prepared, for example, equilenin.

The present compounds are prepared by a fusion process wherein the starting material such as equilenin or equilin is heated with triethylamine-sulfur trioxide. The fusion process is carried out at a temperature of 160° C. to 250° C. for a period of from 5 minutes to 30 minutes. The product is treated with a solvent to remove any starting materials which remain. The solvent may be, for example, anhydrous ether. The product can be purified by recrystallization or other means well known to those skilled in the art.

The present compounds are useful as estrogenic agents. They may be used in estrogen replacement therapy and for the treatment of menopausal symptoms in the form of tablets, capsules, pills, solutions and the like. They can also be used parenterally in the form of sterile solutions or suspensions.

DETAILED DESCRIPTION

The following examples describe in detail the preparation of representative steroidal triethylammonium salts of the present invention.

Example 1.—Preparation of equilenin sulfate triethylammonium salt

In an oil bath at 160–170° C. there is fused 268 mg. of equilenin and 199 mg. of triethylamine-sulfur trioxide. After 4 minutes there remains a clear melt, which is dissolved in methylene chloride and filtered through a pad of hydrous magnesium silicate, and is followed by several washings of methylene chloride. The filtrate is combined and concentrated by boiling, and hexane is added to turbidity while boiling. On cooling crystals of 3 - sulfooxyestra - 1,3,5(10),6,8 - pentaen - 17-one triethylammonium salt, separate and are collected (299 mg.), melting point 153–155° C. Recrystallization from acetone-hexane does not alter the melting point; $[\alpha]_D^{25}+38°$ (chloroform).

Analysis.—Calcd. for $C_{24}H_{33}NO_5S$ (447.57) (percent): C, 64.40; H, 7.43; N, 3.13; S, 7.16. Found (percent): C, 64.46; H, 7.55; N, 3.06; S, 7.21.

Example 2.—Preparation of equilin sulfate triethylammonium salt

An intimate mixture of 3 - hydroxyestra - 1,3,5(10),7-tetraen - 17 - one (0.65 g.) and triethylamine-sulfur trioxide complex (0.48 g.) is placed in a test tube and inserted in a heated oil bath (160 to 190° C.) for 5 minutes. The cooled solid is refluxed with anhydrous ether to remove any starting material and the residue is dissolved in methylene chloride passed through a pad of absorbent. The methylene chloride effluent is refluxed and hydrous ether is gradually added to turbidity. Crystallization affords the desired compound 3-sulfooxyestra-1,3,5(10),7-tetraen-17-one triethylammonium salt (0.64 g.), melting point 155–156°; $[\alpha]_D^{25}+180°$ (CHCl₃).

We claim:
1. A steroidal triethylammonium salt of the formula:

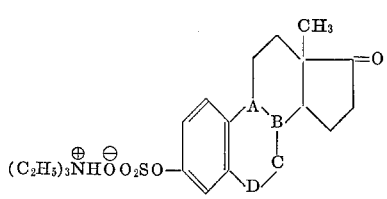

wherein

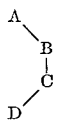

is selected from the group consisting of

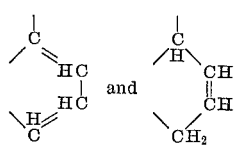

2. The steroidal triethylammonium salt according to claim 1; equilenin sulfate triethylammonium salt.

3. The steroidal triethylammonium salt according to claim 1; equilin sulfate triethylammonium salt.

4. A method of preparing a triethylammonium salt of a compound of the formula:

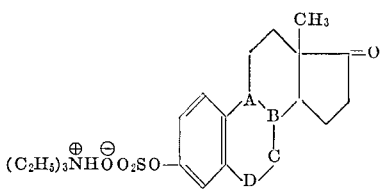

wherein

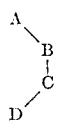

is selected from the group consisting of

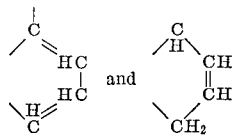

which comprises heating the corresponding 3-hydroxy compound to a temperature of 160° C. to 250° C. with triethylamine-sulfur trioxide and recovering said compound therefrom.

5. The method of preparing a triethylammonium salt according to claim 4; wherein the product obtained is equilenin sulfate triethylammonium salt.

6. The method of preparing a triethylammonium salt according to claim 4, wherein the product obtained is equilin sulfate triethylammonium salt.

References Cited

UNITED STATES PATENTS

| | | | |
|---|---|---|---|
| 2,828,306 | 3/1958 | Greebsch et al. | 260—239.5 |
| 3,060,174 | 10/1962 | Weltstein et al. | 260—239.5 |

ELBERT L. ROBERTS, Primary Examiner